United States Patent [19]

Hart

[11] Patent Number: 5,638,276
[45] Date of Patent: Jun. 10, 1997

[54] MICROPROCESSOR BASED SYSTEM AND METHOD FOR REGULATING A RAILROAD CAR BRAKE PIPE PRESSURE

[75] Inventor: James E. Hart, Trafford, Pa.

[73] Assignee: Westinghouse Air Brake Company, Wilmerding, Pa.

[21] Appl. No.: 489,093

[22] Filed: Jun. 9, 1995

[51] Int. Cl.[6] .................................................. B60T 13/68
[52] U.S. Cl. ...................... 364/426.01; 303/3; 246/182 B
[58] Field of Search ..................... 364/426.01, 426.05; 246/182 R, 169 R, 182 A, 182 B; 303/22.6, 47, 82, 3

[56] References Cited

U.S. PATENT DOCUMENTS

| | | | |
|---|---|---|---|
| 4,013,323 | 3/1977 | Burkett | 303/20 |
| 4,043,606 | 8/1977 | Wickham | 303/82 |
| 5,172,316 | 12/1992 | Root et al. | 364/426.01 |
| 5,507,457 | 4/1996 | Kull | 246/169 P |
| 5,564,794 | 10/1996 | Hart | 303/3 |

*Primary Examiner*—Michael Zanelli
*Attorney, Agent, or Firm*—Gary J. Falce

[57] ABSTRACT

A microprocessor based brake pipe pressure control system for one or more cars of a railroad train wherein the local exhaust of each car brake pipe pressure, under control of an electro-pneumatic valve, is individually regulated such that the gradient of the resultant train brake pipe pressure closely approximates the natural brake pipe pressure gradient for any given brake pipe pressure reduction.

21 Claims, 4 Drawing Sheets

MICROPROCESSOR BASED SYSTEM AND METHOD FOR REGULATING A RAILROAD CAR BRAKE PIPE PRESSURE

BACKGROUND OF THE INVENTION

The present invention relates to brake control systems for railroad freight trains and in particular, to freight trains employing local electro-pneumatic control of brake pipe pressure for controlling operation of the individual car brakes.

Present day freight trains have a brake pipe that runs through each car and is coupled therebetween so as to extend continuously the length of the train. The brake pipe is charged with compressed air typically at the head end by a compressor on the locomotive. The compressed air not only provides the pneumatic brake force at the respective cars, but also serves as a communication link via which the car's brakes are controlled from the locomotive by increasing and decreasing the brake pipe pressure.

Due to the length of modern day freight trains, considerable time is required for the pneumatic control signals to propagate from the front to the rear cars of the train. This can present difficulty in controlling the train, particularly on long trains operating over undulating terrain. Accordingly, electrical means have been proposed for near-instantaneously transmitting the brake pipe pressure control signals to at least one car of the train, such as the last car, or to several cars randomly situated within the train consist, or to all of the cars, depending upon the train make-up. Near-instantaneous remote control of the car brakes may be accomplished either by means of radio signals or by a train line wire, for example. Such an arrangement has the potential of providing greatly improved train performance, due to faster brake applications realized by such remote brake pipe pressure control.

However, due to the natural, fully charged pressure gradient that can exist in a train brake pipe, undesired release of the brakes on cars located toward the rear of the train can occur if remote brake pipe pressure reductions are not carefully controlled. Such pressure gradient exists as a result of the inevitable leakage of compressed air at the hose couplings that connect the brake pipe between cars or at other sources, and due to brake pipe flow resistance encountered in maintaining this leakage by means of the typical operator's brake valve on the locomotive. By electrically controlling a brake pipe pressure reduction to initiate a brake application, it will be appreciated that the brake pipe pressure will be reduced by a corresponding amount at each car equipped with electro-pneumatic control of brake pipe pressure. Because of the natural pressure gradient and the pressure maintaining function of the locomotive brake valve, any pressure reduction that exceeds the natural pressure gradient at the respective cars can subsequently cause that car's brakes to be inadvertently released, as the rearwardly disposed cars brake pipe pressure rises back to a pressure consistent with the natural train pressure gradient at the reduced brake pipe pressure. This phenomenon can be explained by way of the graph of FIG. 1A.

In FIG. 1A, curve A represents the brake pipe pressure when charged to 90 psi at the lead locomotive. The natural gradient of this curve A shows that at car 100, the brake pipe pressure is only 80 psi, when fully charged, a 10 psi gradient from car 1 to car 100. Curve B represents a temporary false brake pipe pressure gradient that exists immediately following an electrically initiated reduction of 15 psi brake pipe pressure throughout the train. Since different pressure heads produce different gradients, it will be appreciated that the true natural gradient of the reduced brake pipe pressure, curve C, differs from that of curve A. Consequently, the brake pipe pressure due to the maintaining feature of the locomotive brake valve will rise toward the rear of the train as the reduced brake pipe pressure seeks its new natural gradient. As is well understood by those in the railroad brake art, an increase in brake pipe pressure of approximately 2 psi can cause a car control valve device to release the car brakes. Such a rise in brake pipe pressure following an electrically initiated brake application, as above explained, can therefore have the undesirable effect of inadvertently releasing the brakes on those cars toward the rear of the train where such rise in brake pipe pressure is most pronounced.

Electric control of brake pipe pressure, as above discussed, can also cause inadvertent release of train brakes, particularly on rear-end cars, for a somewhat different, but related reason. When making an electric brake application following release of a previous application, for example, such re-application may be initiated prior to the brake pipe pressure of the initial application being fully recharged. Such a possibility exists since brake pipe pressure is charged from the locomotive at the head of the train and therefore passes serially through each car, so that charging of the rear end cars is accordingly delayed. This delayed brake pipe pressure build-up on cars situated near the rear end of the train gives rise to what is typically referred to as a temporary false (less than fully charged) pressure gradient in the brake pipe. In that this false pressure gradient gradually decreases, in achieving a natural pressure gradient consistent with the locomotive brake pipe pressure, the brake pipe pressure increase on cars located near the rear of the train may be sufficient to cause an inadvertent and undesirable release of the brakes on these cars.

In FIG. 1B, curve W represents the brake pipe pressure when charged to 90 psi corresponding to curve A in FIG. 1A. The natural gradient of this curve W shows that at car 100, the brake pipe pressure is 80 psi, a 10 psi gradient from car 1 to car 100. Curve X represents the natural brake pipe pressure gradient between car 1 and 100 following a brake pipe pressure reduction from 90 psi to 75 psi at the locomotive, when a brake application is made. This curve corresponds to curve C in FIG. 1A. Curve Y represents the brake pipe pressure in the course of being increased to effect a brake release.

As explained in the foregoing, the apparent delay in recharging the brake pipe produces a false pressure gradient, which depending on train length, degree of leakage, etc., can be quite steep. In the example of FIG. 1B, this false gradient represented by curve Y is assumed to be such that the pressure at car 100 is 75 psi, when a re-application of the train brakes is initiated. Curve Z represents a reduced brake pipe pressure corresponding to the desired brake effort when re-applying the brakes. Assuming a 15 psi reduction throughout the train, the brake pipe pressure at the locomotive is reduced from 90 psi to 75 psi, while the brake pipe pressure at car 100 is reduced from 75 psi to 60 psi. Curve Z thus reflects the false gradient effective at the time the brake re-application is completed.

It will now be appreciated that the brake pipe pressure will gradually rise from front to back in seeking the natural pressure gradient consistent with the reapplication brake pipe pressure at the locomotive. If this re-application brake pipe pressure is assumed to have a natural gradient, as represented by curve V, such that the brake pipe pressure at car 100 is 67.7 psi, the subsequent rise in brake pipe pressure from 60 psi to 67.7 psi will be considerably more than enough to effect a release of the brakes on car 100; and in addition, this rise in brake pipe pressure will progress forward from car 100 to release the brake on those cars where the difference between the reapplication brake pipe pressure of curve Z and the natural gradient pressure of curve V is greater than approximately 2 psi, the pressure differential at which brake release generally occurs. Of course, the greater the false pressure gradient at the time the re-application is initiated, the greater will be the danger of reducing the brake pipe pressure near the rear of the train below the pressure representing the natural gradient following the brake application.

It is therefore highly desirable to cause the brake pipe pressure throughout a long train to be reduced to a pressure as close as possible to the new natural gradient when a service brake pipe reduction is made. With electronic brake signal and control, this maximizes the rapid effectiveness of braking throughout the train. If the brake pipe pressure is reduced substantially less on the rear of the train than it is at the front of the train electrically, the remaining pressure reduction down to the new natural gradient will occur very slowly through pressure exhaust at the locomotive. On the other hand, reducing the brake pipe pressure below the natural gradient creates the danger of an undesired brake release.

SUMMARY OF THE INVENTION

It is therefore the object of this invention to overcome the potentially damaging effect of false brake pipe pressure gradient when controlling brake pipe pressure by electrical means in order to prevent the occasion of unintentional release of a car's brakes.

It is also an objective to regulate the brake pipe pressure of a train electrically so as to reflect, as closely as possible, the locomotive brake pipe pressure reduction without exceeding the natural brake pipe pressure gradient corresponding to the reduced locomotive brake pipe pressure.

In carrying out these objectives, there is provided for a railroad train having a locomotive and a brake pipe that extends from the locomotive through the respective cars, means for receiving electric brake command signals on at least one car, microprocessor means operative responsive to such command signals for providing a desired brake pipe gradient pressure signal that approximates the natural brake pipe gradient pressure effective at that particular car consistent with a reduced locomotive brake pipe pressure, and electro-pneumatic valve means operative in response to the desired brake pipe gradient pressure signal for locally exhausting fluid under pressure at the particular car brake pipe only so long as the desired brake pipe gradient pressure signal is less than the brake pipe pressure effective thereat.

The foregoing objective and other objects and advantages of the present invention will become apparent from the following more detailed explanation of the invention when taken in conjunction with the accompanying drawings in which.

DESCRIPTION AND OPERATION

Figure 2:
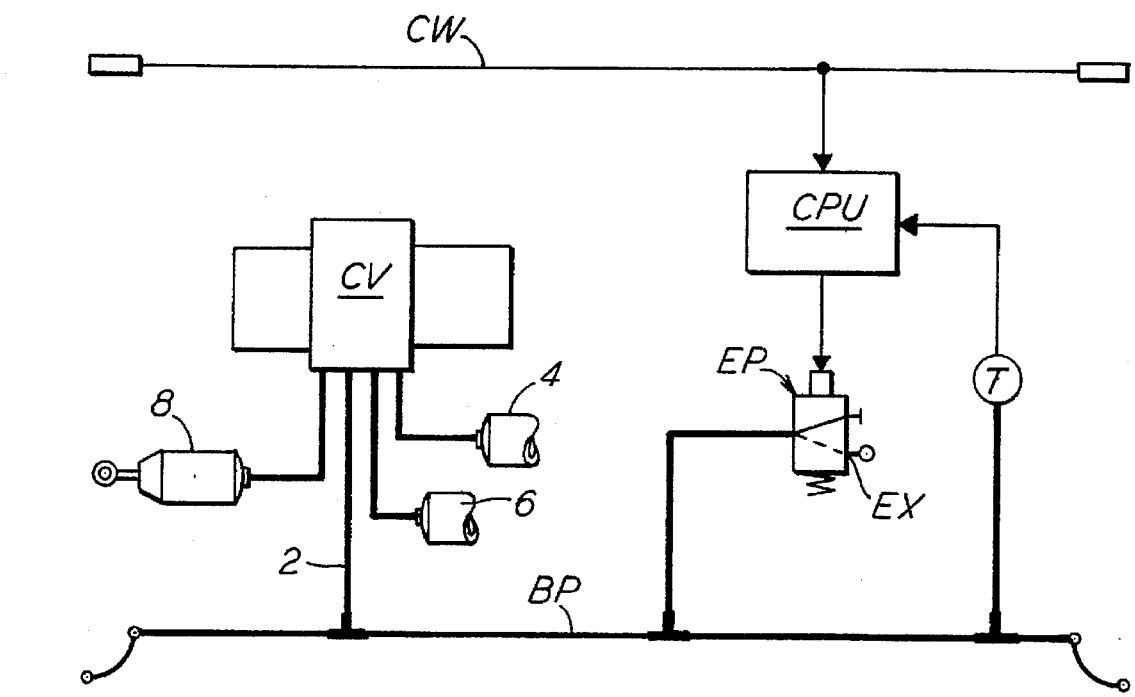
FIG. 2 is a block diagram of a brake control system

As shown in FIG. 2, a railroad car arranged for electric control of brake pipe pressure is provided with a microprocessor control unit CPU, which controls local reductions of air pressure in the train-line brake pipe BP via a solenoid operated, electro-pneumatic valve EP. Where each car is arranged for such electric control, a control wire CW extends through each car and is adapted to be connected with the control wire of an adjoining car to form a continuous train-line wire CW via which electric control of the train brake pipe pressure is provided similar to pneumatic control via brake pipe B.P. Alternatively, such electric control may be byway of radio signals transmitted from the locomotive to each car, such alternative being employed where all of the cars are not equipped for electric control. A standard, locomotive brake valve device (not shown) comprising a locomotive control station connects a source of compressed air to brake pipe BP, which is regulated in accordance with a selected position of the brake valve handle in a well-known manner. This compressed air in brake pipe BP is connected at each car by a branch pipe 2 of brake pipe BP to a control valve device CV, such as the well-known industry standard ABD, ABDW or ABDX type.

Control valve device CV operates in response to increasing brake pipe pressure to charge an auxiliary reservoir 4 and an emergency reservoir 6 to the operating pressure supplied to brake pipe BP, while concurrently venting a brake cylinder device 8, this function of the control valve device being commonly known as "release and charging".

During this "release and charging" function, microprocessor unit CPU deenergizes electro-pneumatic valve EP, in response to an electric signal transmitted either via wire CW or via radio signal. Valve EP accordingly assumes its normal closed position in which the air in brake pipe BP is cut off from atmosphere at a vent port EX.

When brake pipe BP is fully charged to the pressure setting of the locomotive brake valve device, a natural pressure gradient typically exists in the brake pipe due to leakage and the pressure maintaining function of the brake valve. Assuming the locomotive brake valve is set to charge brake pipe BP to 90 psi, the pressure at each car from front to rear of the train will experience a slightly lower pressure due to leakage and fluid flow resistance as the pressure maintaining brake valve attempts to maintain the leakage. In one example, as represented by curve A in the graph of FIG. 1A, this natural pressure gradient is 10 psi, the pressure at the last car being 80 psi as compared to 90 psi at the locomotive.

When a service brake application is desired, the locomotive brake valve is set in the service zone an amount corresponding to the amount of reduction of brake pipe pressure required to achieve the desired brake effect. This pressure reduction constitutes a pneumatic signal that propagates serially from the front to the rear of the train via the train brake pipe BP.

Concurrently, a corresponding electrical brake command signal is transmitted to any and all electrically controlled cars. A pressure transducer (not shown) at the locomotive may be employed to convert the effective locomotive brake pipe pressure reduction to an electrical signal suitable for transmission via wire CW or radio signal. At each car so equipped, microprocessor CPU receives the electrical brake command signal for comparison with a feedback signal $BP_F$ from a pressure transducer T that monitors the car brake pipe pressure. Since the electrical brake command signal is transmitted near instantaneously, as compared to the slower traveling pneumatic signal via brake pipe BP, the reduced brake pipe pressure effective at the locomotive is reflected at microprocessor CPU prior to being reflected at transducer T. Microprocessor CPU thus energizes electro-pneumatic valve EP, which assumes its open position in which brake pipe pressure is vented to atmosphere at a controlled service rate via port EX. In this way, the brake pipe pressure reduction initiated at the locomotive is duplicated near-simultaneously at any car of the train equipped for electric control of brake pipe pressure.

In accordance with the present invention, microprocessor CPU is adapted to regulate the brake pipe pressure effective at that car so as to correspond substantially to the natural gradient pressure for the location that particular car occupies in the train for the effective locomotive brake pipe pressure and brake pipe leakage conditions. Again referring to the graph of FIG. 1A and assuming a 15 psi brake pipe pressure reduction at the locomotive from 90 psi to 75 psi, this natural gradient pressure $G_{N2}$ at any car N following the reduction can be found from the curve C, which differs from curve A, it being understood that for different brake pipe pressures maintained at the locomotive brake valve, different pressure gradients exist. The present invention is based upon the fact that, with a fixed brake pipe leakage pattern, this natural pressure gradient can be closely approximated as linearly proportional to the brake pipe pressure at the locomotive.

Microprocessor CPU is programmed to process information in order to regulate the brake pipe pressure for that particular car location in a train, as will now be explained with reference to the flow chart of FIGS. 3A and 3B, using the assumed brake pipe pressure reduction of 15 psi from an initial charge of 90 psi to a reduced pressure of 75 psi.

Microprocessor CPU receives brake command signals $P_1$ and $P_2$ transmitted from the locomotive. Signal $P_1$ represents the operating pressure to which the brake pipe is to be charged at the locomotive, as indicated by function block 10. In response to reception of signal $P_1$, a variable signal $P_{11}$ is set equal to signal $P_1$, as indicated at block 11. A feedback signal $BP_F$ provided by Transducer T corresponding to the individual car brake pipe pressure is monitored by microprocessor CPU, as indicated by block 12. A decision block 13 determines if this brake pipe feedback signal $BP_F$ is increasing. If not, the brake pipe BP is deemed to be fully charged and the initial car brake pipe pressure $P_{N1}$ resulting from control signal p is set at a value corresponding to feedback signal $BP_f$, as indicated by block 14. In the event feedback signal $BP_F$ is still increasing indicative of the brake pipe still being charged, function block 12 is directed to re-check feedback signal $BP_F$ after a predetermined time delay, such that monitoring of the car brake pipe pressure continues periodically until the brake pipe is fully charged to the pressure represented by control signal $P_1$.

The foregoing initialization process takes place when a train is initially charged to a predetermined operating pressure, or when the locomotive brake valve is adjusted to change the operating pressure to which the brake pipe is charged, or when cars are added or removed in the train make-up.

Figure 3A:
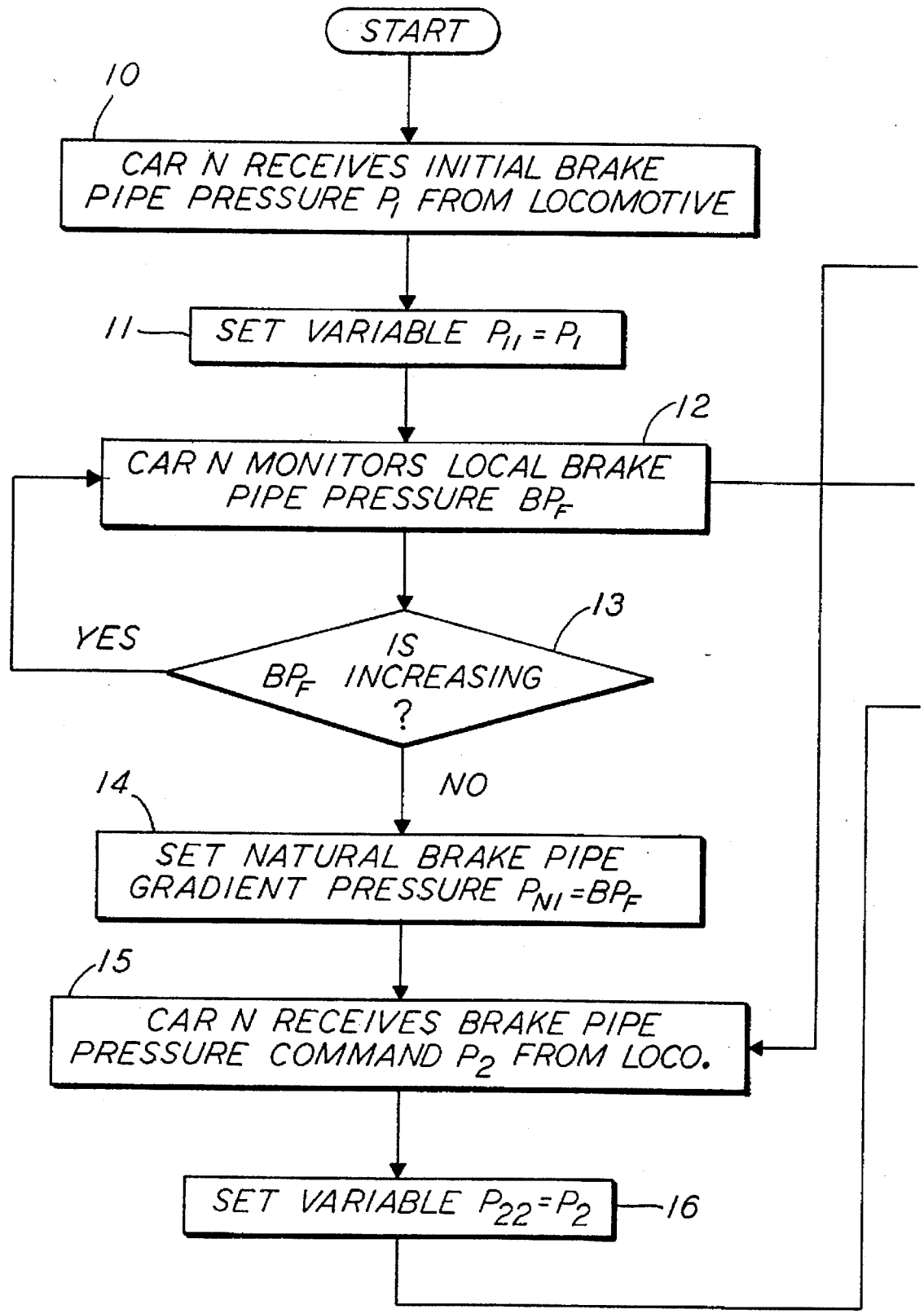
FIGS. 3A and 3B are a flow chart outlining a routine in accordance with which the microprocessor of FIG. 2 may be programmed to electrically achieve a desired brake pipe pressure that approximates the natural gradient pressure for any particular car location in the train according to the effective locomotive brake pipe pressure.

Following this initialization process, a subsequent brake application command signal P2 representing a reduction of brake pipe pressure is emitted by the locomotive via wire CW and received at each car microprocessor, as indicated by the function block 15 in the flow chart of FIG. 3A. Another variable signal $P_{22}$ is set equal to the reduced brake pipe pressure signal $P_2$, as indicated at block 16. Since brake pipe pressure BP has been reduced, corresponding to a desired brake application, variables $P_{11}$ and $P_{22}$ will not be equal and the program will pass from decision block 17 to decision block 18. Since the brake pipe pressure has been reduced, the value of variable $P_{22}$ will be less than the value of variable $P_{11}$, as determined at decision block 18. Variable $P_{11}$ is then reset to the value of variable $P_{22}$ at block 19.

The routine concurrently passes to function block 20 where the desired brake pipe pressure $P_{N2}$ at car N is calculated. In accordance with a first embodiment of the invention, the desired brake pipe pressure $P_{N2}$ is calculated using equation (1) as follows:

$$P_{N2} = \frac{P_2}{P_1} \times P_{N1} \tag{1}$$

where $P_1$ is the signal corresponding to the operating pressure to which the brake pipe BP is charged, $P_2$ is the brake command signal corresponding to the locomotive brake pipe pressure following a reduction from the operating pressure $P_1$, and $P_{N1}$ is a signal corresponding to the initial brake pipe pressure at car N when the brake pipe is fully charged, taking into account the natural gradient. The calculated pressure $P_{N2}$ using the foregoing equation (1) can be validated from the graph of FIG. 1A, which shows that the desired car brake pipe pressure $P_{N2}$ at car #100 is less than the initial car brake pipe pressure $P_{N2}$ by the same percentage that brake pipe pressure $P_2$ is less than the initial brake pipe charge $P_1$ at the locomotive. Assuming car N=100, and that curve A represents the initial train brake pipe pressure gradient, the assumed initial brake pipe pressure effective at car #100 =80 psi. Thus, the desired brake pipe pressure $P_{N2}$ at car #100 is 75/90 ×80 or 66.7 psi.

It will now be appreciated that any other car in a train of such cars arranged in accordance with the foregoing will generate its own individual desired brake pipe pressure signal $P_{N2}$ at the car microprocessor in the same manner as explained above. This pressure $P_{N2}$ at any other car N will differ from the desired brake pipe pressure at car #100, depending upon its location in the train, and the natural gradient of the initial brake pipe pressure.

In this way, a normalized train brake pipe pressure gradient can be generated under electronic control that closely approximates the natural train brake pipe pressure gradient for any given pressure, thereby eliminating the aforementioned undesirable effect of false gradient.

If desired, a factor of safety can be built into the system by adding a correction factor C to the desired brake pipe pressure $P_{N2}$, as indicated at block 21. The correction factor value may, for example, be 1.5 psi., which will ensure that the electronically controlled brake pipe pressure is not reduced below a value consistent with the natural brake pipe pressure gradient. The corrected brake pipe pressure $P_c$ at car N is compared at decision block 22 with the car brake pipe feedback signal $BP_F$. If the corrected brake pipe pressure signal $P_c$ is less than the feedback signal $BP_F$, microprocessor CPU outputs a signal to energize electro-pneumatic valve EP, as indicated at function block 23. In its energized state, electro-pneumatic valve EP establishes a communication via which pressure in brake pipe BP is vented to atmosphere at a controlled rate. This local exhaust of brake pipe pressure continues until the corrected car brake pipe pressure signal $P_c$ is equal to or exceeds the feedback signal $BP_F$, at which point microprocessor CPU outputs a signal to de-energize electro-pneumatic valve EP, as indicated at function block 24. In its de-energized state, electro-pneumatic valve EP is spring-returned to its normal position in which the exhaust communication is cut-off and the brake pipe pressure reduction is terminated at car N.

During the aforementioned control process, variable $P_{11}$ was reset at block 19 to a value corresponding to the value of variable $P_{22}$, corresponding to the reduced brake pipe pressure $P_2$. Consequently, decision block 17 recognizes the equality of variables $P_{11}$ and $P_{22}$ concurrently with the function carried out in accordance with block 20, and directs the system routine to return to block 15.

If a further reduction of brake pipe pressure $P_2$ is now called for by the locomotive, variable $P_{22}$ is set equal to the further reduced pressure $P_2$ at block 16, thereby causing a difference to again be detected at decision block 17 between variables $P_{11}$ and $P_{22}$. In accordance with the further reduced brake pipe pressure, variable $P_{22}$ is less than variable $P_{11}$, resulting in decision block 18 directing block 19 to again reset variable $P_{11}$ equal to variable $P_{22}$ preparatory to a possible subsequent reduction of brake pipe pressure. Concurrently, the routine proceeds to block 20 where a new brake pipe pressure command $P_{N2}$ is calculated according to equation (1).

In this manner the system is receptive to continuing electronically controlled reductions of brake pipe pressure without exceeding a pressure reduction consistent with the natural brake pipe pressure gradient at car N for any given locomotive brake pipe pressure.

When it is desired to release a brake application, brake pipe pressure is increased at the locomotive and a corresponding brake command signal $P_2$ is transmitted. In this case, the control processing loop comprised of blocks 15–18 detects the resultant increased change in signal $P_2$ and the corresponding increased value of variable $P_{22}$, as compared to variable $P_{11}$, to accordingly direct the routine back to block 12 where the local brake pipe pressure is monitored to re-initialize the system.

Figure 3B:
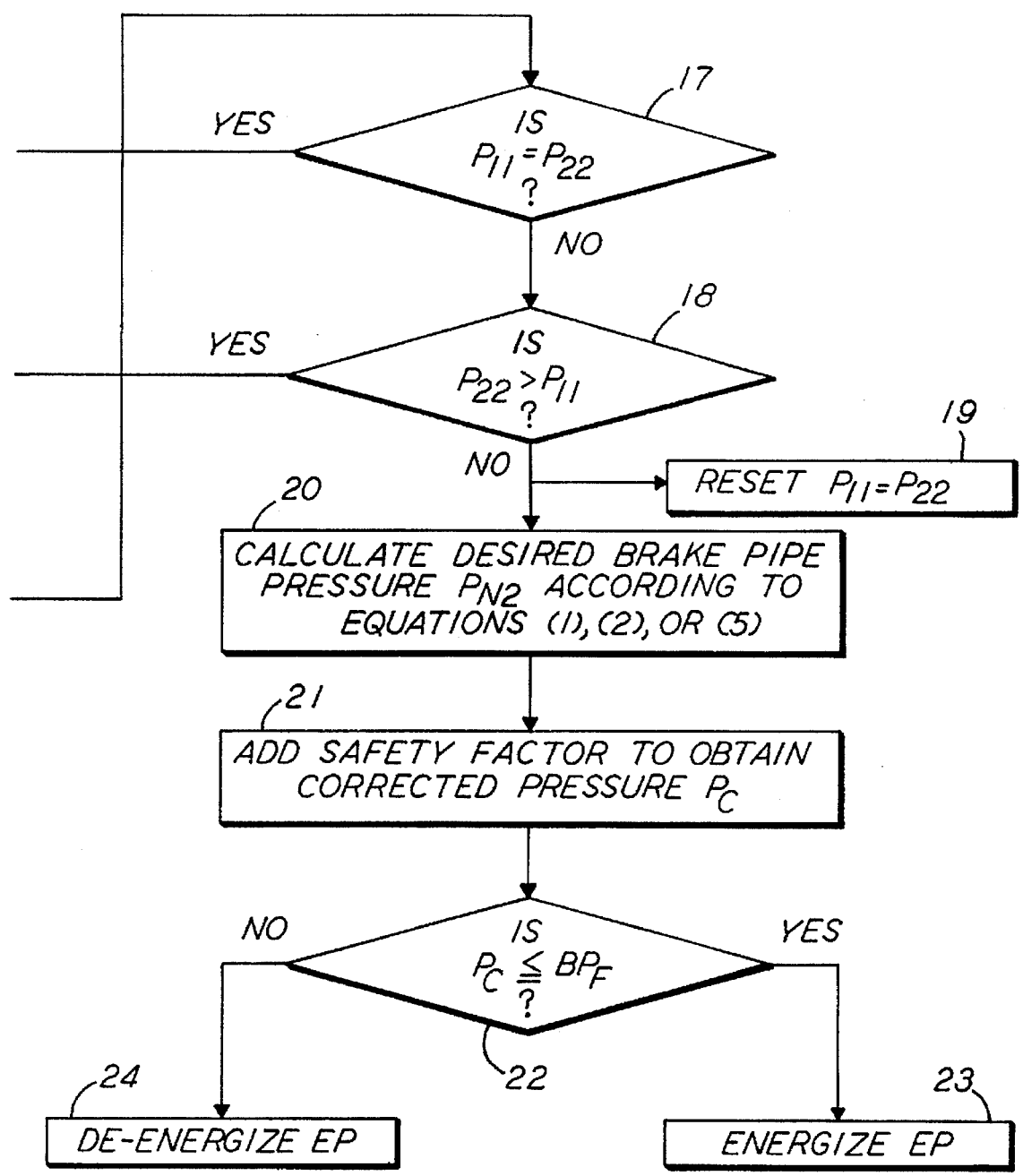

In a second embodiment of the invention, microprocessor CPU follows the routine shown in the flow chart of FIGS. 3A and 3B, in order to generate the desired brake pipe pressure $P_{N2}$ at car N. In this case, the desired brake pipe pressure $P_{N2}$ is found using equation (2), as follows:

$$P_{N2}=P_{N1}-R_N \tag{2}$$

where $$R_N = \frac{P_{N1}}{P_1} \times R \tag{3}$$

and $$R=P_1-P_2 \tag{4}$$

Substituting the assumed values for car #100, $$R=90-75=15 \tag{4}$$

$$R_N = \frac{80}{90} \times 15 = 13.35 \tag{3}$$

$$P_{N2}=80-13.35=66.65 V66.7 \tag{2}$$

Figure 1A:
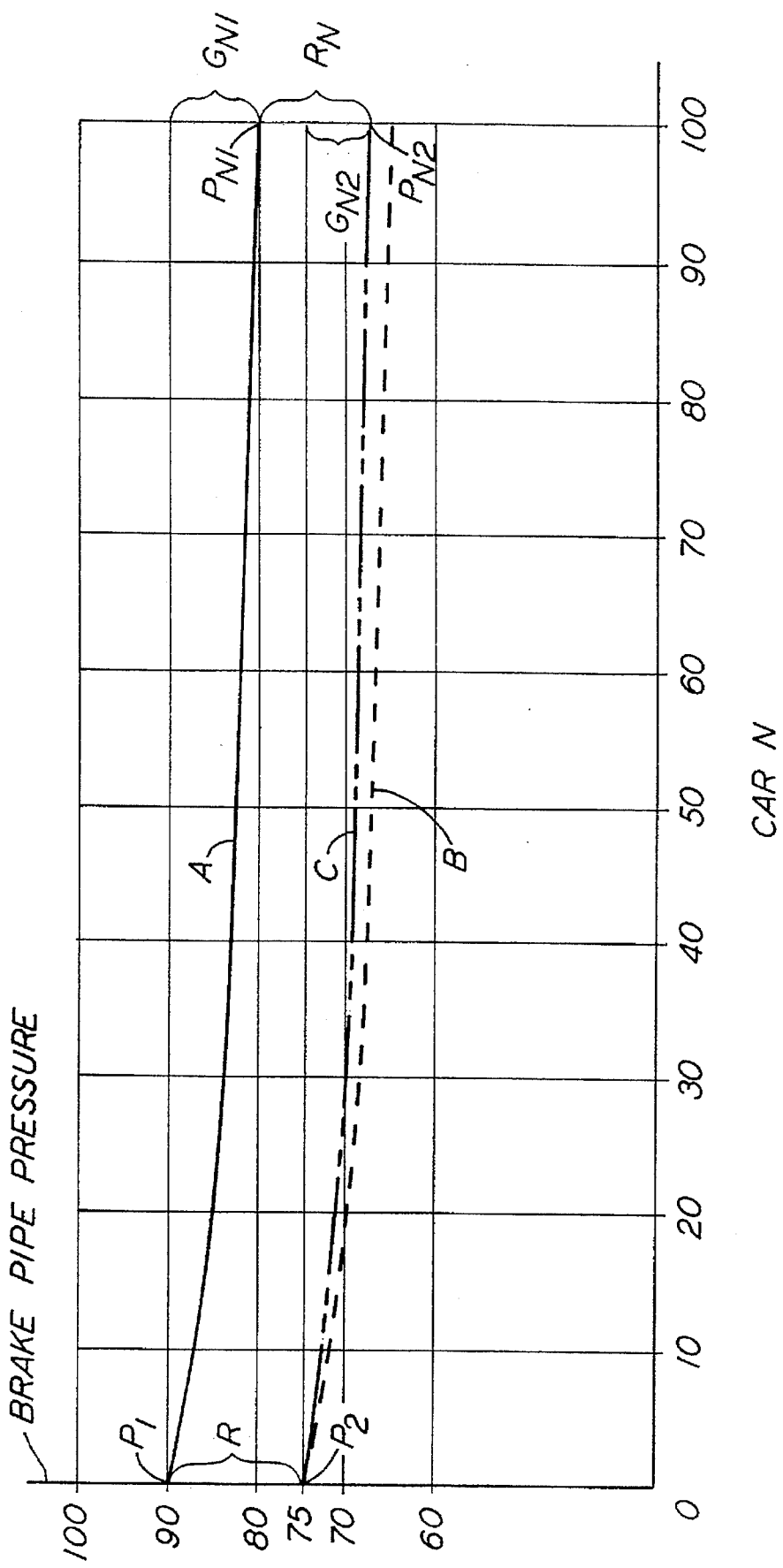
FIGS. 1A and 1B are graphs depicting different conditions of false brake pipe pressure gradient for which the present invention is applicable in avoiding inadvertent brake release when electrical control of brake pipe pressure is employed.
Figure 1B:
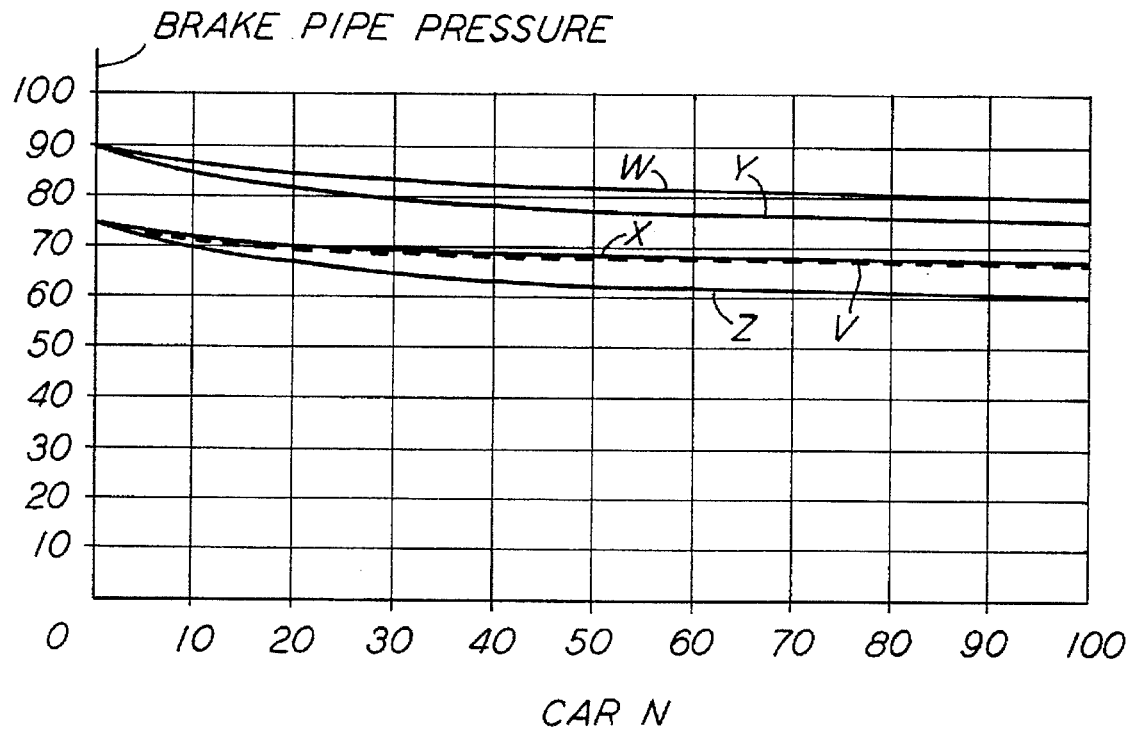

The foregoing calculation can be validated from the graph of FIG. 1A, taking car #100 as an exemplary car N for which the desired reduced brake pipe pressure $P_{N2}$ is to be determined. The measured distance $R_N$ between curves A and C decreases from car #1 to car #100 as the distance $G_{N1}$ increases from car #1 to car #100.

In a third embodiment of the invention, microprocessor CPU also follows the routine shown in the flow chart of FIGS. 3A and 3B, in order to generate the desired brake pipe pressure $P_{N2}$ at car N. In this case, however, a different set of equations is used to find the desired brake pipe pressure $P_{N2}$, as follows:

$$P_{N2}=P_2 G_{N2} \tag{5}$$

where $$G_{N2} = \frac{P_2}{P_1} \times G_{N1} \tag{6}$$

and $$G_{N1}=P_1-P_{N1} \tag{7}$$

Substituting the assumed values for car #100, $$G_{N1}=90-80=10 \tag{7}$$

$$G_{N2} = \frac{75}{90} \times 10 = 7.33 \tag{6}$$

$$P_{N2}=75-7.33=67.67 V 67.7 \tag{5}$$

Again, these calculations can be validated from the graph of FIG. 1A, taking car #100 as an exemplary car N for which the desired reduced brake pipe pressure is to be determined.

It will now be appreciated that in generating a desired brake pipe pressure signal at the respective cars in a train by programming the respective car microprocessors CPU, in accordance with the flow chart of FIGS. 3A and 3B, a normalized gradient curve may be generated that approximates curve C representing the natural pressure gradient that exists in brake pipe BP for a given head end pressure initiated at the locomotive. As can be seen, this normalized gradient curve deviates from the false gradient curve B that would otherwise result, without benefit of the present invention, in response to an electro-pneumatic reduction of brake pipe pressure any car or cars of a train equipped for electric control of brake pipe pressure. In so regulating the respective car brake pipe pressures, the normalized brake pipe pressure gradient curve closely corresponds to the true or natural pressure gradient and thereby overcomes the aforementioned possibility of inadvertent brake releases.

I claim:

1. An electro-pneumatic brake pipe pressure control system for at least one car of a railroad train through which a brake pipe extends from the locomotive to the last car thereof, said brake pipe having different natural pressure gradients depending upon the locomotive brake pipe pressure, said electro-pneumatic brake pipe pressure control system comprising:

(a) means for receiving electric brake command signals from said locomotive corresponding to said brake pipe fluid pressure thereat;

(b) microprocessor means operative responsive to said electric brake command signals for providing a desired brake pipe pressure signal $P_{N2}$ corresponding to a pressure that approximates the natural gradient pressure effective at a location along said brake pipe depending upon the position of said at least one car in said train when a reduced brake pipe pressure is established at said locomotive; and (c) electro-pneumatic valve means for locally exhausting fluid pressure from said brake pipe of said at least one car in response to said desired brake pipe pressure signal $P_{N2}$ being less than the pressure effective at said brake pipe thereof.

2. An electro-pneumatic brake pipe pressure control system as recited in claim 1, wherein said means for receiving said electric brake command signals comprises a control wire via which said electric brake command signals are transmitted from said locomotive to said at least one car of said train.

3. An electro-pneumatic brake control system as recited in claim 1, further comprising transducer means for measuring the pressure of fluid effective at said brake pipe of said at least one car and connecting a corresponding feedback pressure signal $BP_F$ to said microprocessor means.

4. An electro-pneumatic brake pipe pressure control system as recited in claim 3, wherein said microprocessor means comprises:
   a) first means subject to said brake command signals for establishing a first pressure signal $P_1$ corresponding to the operating pressure to which said brake pipe is initially charged at said locomotive;
   b) second means for providing an initial pressure signal $P_{N1}$ corresponding to the brake pipe gradient pressure effective at said at least one car in response to said first pressure signal $P_1$; and
   c) third means subject to said brake command signals for establishing a second pressure signal $P_2$ corresponding to a subsequent pressure effective at said locomotive when said brake pipe pressure is reduced.

5. An electro-pneumatic brake pipe pressure control system as recited in claim 4, whereby said microprocessor means further comprises means subject to said brake pipe pressure feedback signal $BP_F$ for detecting a stabilized condition of said at least one car brake pipe pressure, said second means providing said initial pressure signal $P_{N1}$ in response to such stabilized condition of said brake pipe pressure.

6. An electro-pneumatic brake pipe pressure control system as recited in claim 5, wherein said microprocessor means further comprises means for calculating said desired brake pipe pressure signal $P_{N2}$ in accordance with said initial pressure signal $P_{N1}$ being reduced by a percentage corresponding to the ratio of said second pressure signal $P_2$ to said first pressure signal $P_1$.

7. An electro-pneumatic brake pipe pressure control system as recited in claim 5, wherein said microprocessor means comprises:
   a) means for calculating a reduction signal R indicative of a reduction of the brake pipe fluid pressure at said locomotive based on the difference between said first pressure signal $P_1$ and said second pressure signal $P_2$;
   b) means for calculating a signal $R_N$ indicative of a desired pressure reduction at said at least one car in accordance with said locomotive brake pipe pressure reduction R being reduced by a percentage corresponding to the ratio of said initial pressure signal $P_{N1}$ to said first pressure signal $P_1$; and
   c) means for calculating said desired brake pipe pressure signal $P_{N2}$ in accordance with the difference between said initial pressure signal $P_{N1}$ and said desired brake pipe pressure reduction $R_N$ at said at least one car.

8. An electro-pneumatic brake pipe pressure control system as recited in claim 5, wherein said microprocessor means comprises:
   a) means for calculating a signal $G_{N1}$ indicative of the natural pressure gradient initially effective at said at least one car brake pipe in accordance with the difference between said first pressure signal $P_1$ and said initial pressure signal $P_{N1}$;
   b) means for calculating a signal $G_{N2}$ indicative of the natural brake pipe pressure gradient effective at said at least one car for said reduced locomotive brake pipe pressure in accordance with said natural pressure gradient signal $G_{N1}$ being reduced by a percentage corresponding to the ratio of said second pressure signal $P_2$ to said first pressure signal $P_1$; and
   c) means for calculating said desired brake pipe pressure signal $P_{N2}$ in accordance with the difference between said second pressure signal $P_2$ and said natural brake pipe pressure gradient signal $G_{N2}$.

9. An electro-pneumatic brake pressure control system as recited in claim 1, wherein said microprocessor means comprises means for adding a safety factor to said desired brake pipe pressure signal $P_{N2}$.

10. An electro-pneumatic brake pipe pressure control system as recited in claim 1, wherein said at least one car of said train is said last car thereof.

11. An electro-pneumatic brake pipe pressure control system as recited in claim 1, wherein said at least one car of said train is a single car intermediate said locomotive and said last car.

12. An electro-pneumatic brake pipe pressure control system as recited in claim 1, wherein said at least one car of said train is plurality of cars randomly by situated in said train.

13. An electro-pneumatic brake pipe pressure control system as recited in claim 1, wherein said at least one car of said train is all of the cars thereof.

14. A microprocessor based brake pipe pressure control system for one or more cars of a railroad train having a locomotive and a brake pipe extending from the control station of said locomotive through the respective cars, a method for electrically regulating the brake pipe pressure at respective ones of said one or more cars comprising the steps of:
   a) receiving first and second electrical brake command signals $P_1$ and $P_2$ corresponding to the effective operating pressure to which said brake pipe is charged at said locomotive control station and to a subsequently reduced pressure at said locomotive control station corresponding to a brake application command;
   b) providing an initial pressure signal $P_{N1}$ at which said brake pipe pressure at said respective car is stabilized during said charging thereof;
   c) calculating a desired brake pipe pressure signal $P_{N2}$ when said locomotive brake pipe pressure is reduced in accordance with said brake command signal $P_2$;
   d) providing a feedback signal $BP_F$ corresponding to the effective brake pipe pressure at said respective car;
   e) comparing said desired brake pipe pressure signal $P_{N2}$ with said feedback signal $BP_F$; and
   f) exhausting said respective car brake pipe pressure only when said desired brake pipe pressure signal $P_{N2}$ is less than said feedback signal $BP_F$.

15. The method as recited in claim 14, wherein the step of calculating said desired brake pipe pressure signal $P_{N2}$ is achieved in accordance with the equation:

$$P_{N2} = \frac{P_2}{P_1} \times P_{N1}$$

16. The method as recited in claim 14, wherein the step of calculating said desired brake pipe pressure signal $P_{N2}$ is achieved in accordance with the equations:

$$R = P_1 - P_2$$

$$R_N = \frac{P_{N1}}{P_1} \times R$$

$$P_{N2} = P_{N1} - R_N$$

where R is the total pressure reduction from the operating pressure to which said brake pipe is charged at said locomotive; and $R_N$ is the brake pipe reduction effective at said respective car in accordance with the natural pressure gradient of said subsequently reduced brake pipe pressure at said locomotive.

17. The method as recited in claim 14, wherein the step of calculating said desired brake pipe pressure signal $P_{N2}$ is achieved in accordance with the equations:

$$G_{N1} = P_1 - P_{N1}$$

$$G_{N2} = \frac{P_2}{P_1} \times G_{N1}$$

$$P_{N2} = P_2 - G_{N1}$$

where $G_{N1}$ is the natural brake pipe pressure gradient between said locomotive and said respective car in accordance with said first brake command signal $P_1$; and $G_{N2}$ is the natural brake pipe pressure gradient between said locomotive and said respective car in accordance with said second brake command signal.

18. The method as recited in claim 14, wherein said one or more cars is the last car of said train.

19. The method as recited in claim 14, wherein said one or more cars is a single car intermediate said locomotive and the last car of said train.

20. The method as recited in claim 14, wherein said one or more cars is a plurality of cars randomly situated in said train.

21. The method as recited in claim 14, wherein said one or more cars is all of the cars of said train.

* * * * *